United States Patent
Soun Dar Rajan et al.

(10) Patent No.: US 11,998,953 B2
(45) Date of Patent: Jun. 4, 2024

(54) RECOVERY OF HIGHER VOLUME AND HIGHER QUALITY RECYCLABLES FROM A MIXED STREAM

(71) Applicant: Republic Services Intellectual Property Holdings, LLC, Phoenix, AZ (US)

(72) Inventors: Prabhu Soun Dar Rajan, Phoenix, AZ (US); John Joseph Riconosciuto, West Chicago, IL (US); Peter J. Keller, Phoenix, AZ (US); David Call, Phoenix, AZ (US); Zhenni Niu, Phoenix, AZ (US)

(73) Assignee: Republic Services Intellectual Property Holdings, LLC, Phoenix, AZ (US)

( * ) Notice: Subject to any disclaimer, the term of this patent is extended or adjusted under 35 U.S.C. 154(b) by 0 days.

(21) Appl. No.: 17/981,319

(22) Filed: Nov. 4, 2022

(65) Prior Publication Data
US 2023/0144877 A1    May 11, 2023

Related U.S. Application Data

(60) Provisional application No. 63/276,126, filed on Nov. 5, 2021.

(51) Int. Cl.
*B07C 5/38* (2006.01)
*B07C 5/02* (2006.01)

(52) U.S. Cl.
CPC ............ *B07C 5/38* (2013.01); *B07C 5/02* (2013.01); *B07C 2501/0045* (2013.01); *B07C 2501/0054* (2013.01)

(58) Field of Classification Search
CPC .. B07C 5/38; B07C 5/02; B07C 5/367; B07C 5/361; B07C 2501/0045; B07C 2501/0054
See application file for complete search history.

(56) References Cited

U.S. PATENT DOCUMENTS

| 5,536,373 A | 7/1996 | Carlson et al. |
| 10,661,984 B2 | 5/2020 | Chan et al. |

(Continued)

FOREIGN PATENT DOCUMENTS

| EP | 0711368 | 5/1996 |
| WO | 20190195257 | 10/2019 |

OTHER PUBLICATIONS

"Standards for a Sustainable Future," https://verra.org (2021).
(Continued)

*Primary Examiner* — Jacob S. Scott
*Assistant Examiner* — Miraj T. Patel
(74) *Attorney, Agent, or Firm* — Stradley Ronon Stevens & Young, LLP; David P. Fitzgibbon; Philip J. Foret

(57) ABSTRACT

An automated process for separating and recycling a broad mix of waste material including, but not limited to, paper and flexible plastics. A materials recovery facility (MRF) collects, presorts, and separates into individual commodities the material, then separates partially processed 2D blends from 3D containers, while refraining from any quality control of the 2D blends, and bales the 2D blends. A fiber center receives the bales from the MRF, aggregates the partially processed 2D blends, removes recyclable commodities including flexible plastics from the 2D blends, aggregates each recyclable commodity that is removed from the 2D blends, and forms separate commodity streams of clean paper and clean flexible plastics. Also provided are a related fiber center (and an infrastructure including the center) and at least one computer-readable non-transitory storage medium embodying software for performing the process.

20 Claims, 10 Drawing Sheets

(56) References Cited

U.S. PATENT DOCUMENTS

| | | |
|---|---|---|
| 11,123,939 B2 | 9/2021 | Chan et al. |
| 2015/0324760 A1* | 11/2015 | Borowski ............. B65F 1/0006 |
| | | 705/308 |
| 2018/0243751 A1* | 8/2018 | Schellati ................... F23G 5/02 |
| 2019/0217342 A1* | 7/2019 | Parr ........................ B07C 5/342 |
| 2021/0170707 A1 | 6/2021 | Chan et al. |
| 2022/0180501 A1 | 6/2022 | Perez et al. |

OTHER PUBLICATIONS

PICVISA Machine Vision Systems, S.L. of the United Kingdom titled "Artificial Intelligence: The Recycling Revolution" (Feb. 14, 2020), available at https://recyclinginside.com/artificial-intelligence-the-recycling-revolution/.

* cited by examiner

RECOVERY OF HIGHER VOLUME AND HIGHER QUALITY RECYCLABLES FROM A MIXED STREAM

RELATED APPLICATIONS

This application claims the benefit of priority to U.S. Provisional Patent Application Ser. No. 63/276,126, filed on Nov. 5, 2021, the contents of which are incorporated in this application by reference.

TECHNICAL FIELD

The present disclosure relates generally to the problem of separating and recycling waste material and, more particularly, to recovering a high volume and high quality of recyclables from a broad mix of waste material including, but not limited to, flexible plastics and paper.

BACKGROUND OF THE DISCLOSURE

Recycling is the process of turning used materials and waste into new products. There are many reasons to recycle. Among those reasons are a reduction in the air, water, and land pollution that is caused by discarded or burnt waste, meaning that the air we breathe, the water we drink, and the land on which we live is safer and healthier. The recycling process is one of the most effective ways that we can help preserve our planet and make sure that it is a healthy place to live. Recycling further reduces the amount of waste sent to landfills and incinerators. Recycling still further reduces our reliance on increasingly scarce natural resources and raw materials such as timber, water, and minerals when manufacturing new products. It takes less energy to recycle used materials than it does to produce items with raw materials, and saving energy is good both for the environment and for consumers because recycling reduces the prices of products. Recycling also creates jobs for people, as recycling companies employ many thousands of workers all over the world. Therefore, as the reasons outlined above show, the recycling process helps more than just the environment.

We should all recycle everything that is capable of going through the recycling process. Much of our household waste, industrial waste (defined as coming from factories and industrial plants), and commercial waste (defined as coming from wholesalers, catering establishments, shops, and offices) can be broken down and reprocessed to make new products. Some common materials that can and should be recycled include: (1) paper such as newspapers, paper towels, magazines, and cardboard packaging; (2) metal such as aluminum and steel cans, metal food containers, and foil; (3) plastic such as bottles, carrier bags, tubs, food containers, and wrappers; and (4) glass such as bottles, jars, and food containers.

Recycling includes the following three steps, which create a continuous loop, represented by the familiar recycling symbol comprising three arrows that form a circle. The first step is collection and processing of recyclables. There are several methods for collecting recyclables, including curbside collection, drop-off centers, and deposit or refund programs. After collection, recyclables are sent to a materials recovery facility ("MRF") also known, more generally, as a recycling center to be sorted, cleaned, and processed into materials that can be used in manufacturing. Recyclables are bought and sold just like raw materials would be, and prices go up and down depending on supply and demand in the United States and the world. This disclosure focuses on the step of collecting and processing recyclables.

In the second step of the recycling process, products are manufactured with recycled materials either collected from a recycling program or from waste recovered during the normal manufacturing process. More and more products are being manufactured with recycled content and product labels will sometimes include how much of the content was from recycled materials. Finally, in the third step of the recycling process, consumers close the recycling loop by buying new products made from recycled materials. Consumers should look both for products that contain recycled content and for products that can be easily recycled.

The first step of the recycling process, collecting and processing recyclables, has historically been accomplished manually. FIG. 1 illustrates the manual step 1 of the conventional recycling process, in which workers 2 process recyclable materials 3. This labor-intensive process created a need to automate the steps of collecting and processing recyclables to increase productivity. More recently, recyclables are sorted at the MRF into different material streams by machines which reduce but do not eliminate the need for manual recovery and quality control.

A need remains, however, to better ensure that the highest quality and cleanest recyclable materials are extracted during the sorting process at the MRF. High standards of quality ensure that materials collected for recycling can be most efficiently turned into high-grade feedstock that fetches the best prices in the marketplace for recyclable material. Thus, the work that recycling sorters do is essential to the overall functioning of the process. Yet that work can be time consuming. There is a need to automate the step of collecting and processing recyclables to increase productivity and enhance quality.

Methods have been implemented, or at least suggested, toward automation. For example, waste matter of various categories normally is packaged as tightly compacted bales of considerable size and weight. The main advantages of baling solid waste materials are: (1) ease of handling, transport, and storage; (2) bales are compatible with the recycling machines to recycle any waste which can be reused, like reusable plastic and reusable paper; and (3) the storage of baled waste is more compact by which optimal usage of the storage space can be done for stocking the waste.

The nature of these tightly compacted and very heavy bales presents serious problems, however, in processing the miscellaneous tightly compacted contents of the bales in an economical and efficient manner such that the recyclable materials recovered from the miscellaneous types of waste in the bale are of a high quality and free of contaminants with minimal damage to those materials. U.S. Pat. No. 5,536,373 titled "Recycle Processing of Baled Waste Material" (and its counterpart, European Patent No. 0711368) attempts to address those problems for certain baled waste material. Disclosed is a method of processing baled waste material containing waste paper having fibers contaminated to various degrees. The method is intended to recover usable cellulosic fiber pulp from the bale. The bale contents are impregnated with a fiber swelling and debonding fluid by enclosing the bale within a closed chamber and subjecting the chamber and contained bale to multiple pressure environmental conditions, which preferably include a vacuum, while submerging the bale in the debonding fluid. The impregnated bale contents are allowed to soak for a sufficient period that the lesser degree contaminated fibers become swollen after which the bale is subjected to a sufficiently low degree of pulping agitation as initiates separation of the swollen fibers without significant damage to the fibers and which does not significantly decrease the sheet size of higher degree contaminated bonded fibers and other contaminants. The agitated bale contents are separated in a screen separator into a pulp-containing slurry and a reject mass of higher degree contaminated, unswollen fibers and contaminants. If the reject mass contains a significant degree of fibrous material, it is compressed into bale form and again subjected to a multiple pressure liquid impregnation treatment in a closed chamber after which the multiple pressure impregnated bale is subjected to the same or similar recycling operations in separating out the fiber pulp slurry.

This automated procedure has its own disadvantages. The procedure adds time and cost to the recycling process. For example, time is required for the waste paper contents of a tightly compacted bale to be impregnated, subjected to pressure, soaked, agitated, and separated. In addition, after separation of the relatively uncontaminated cellulosic fibers of waste paper contained in the bales, it has been the general practice to dispose the non-debonded and contaminant containing or contaminant coated fibrous matter to landfill along with the non-fibrous waste matter and contaminants contained in the bales.

To overcome the shortcomings of the known technology, a new automated process (or method) for material separating and recycling is provided by the present disclosure. An object of the present disclosure is to meet the need for recovering a high volume and high quality of recyclables from a broad mix of waste material including, but not limited to, flexible plastics and paper. A related object is to meet the need for separating flexible plastics from paper and aggregating the flexible plastics sufficiently to create a volume of flexible plastic recyclables having commercial value. Another object is to achieve a high quality of recyclable material regardless of the source. A need remains in the recycling market for a process that can aggregate mixed waste materials and separate them into pure streams of clean recycled materials suitable for manufacturing new products.

It is still another object of the present disclosure to improve the processing of waste materials containing a mix of various types (e.g., paper, flexible plastics, and others) for recycling the contents of the mixed waste materials. Another object is to recover the maximum amount of high quality recyclable materials from the various categories and types of mixed waste materials with a minimum degradation or damage to the recovered materials. Still another object is to provide a vertically integrated process of recycling both paper and flexible plastics in the same center via a hub and spoke infrastructure.

A further object of the present disclosure is to leverage economies of scale and aggregate mixed paper and flexible plastics from several recycling facilities and sort into purified recycled streams for end-customers. A still further object is to reduce capital expenditure and operating expenditure at recycling facilities. Yet another object is to homogenize curbside programs across feeder markets regardless of local recycling processing capabilities through centralizing complexity at the recycling facility location.

MRFs currently face tradeoffs between recovery and purity. The more material that is recovered, the greater the need for quality management. Conversely, if higher-quality products need to be shipped, more desirable material will be missed and find its way to the residue. There remains a need to eliminate the tradeoff by introducing a process of integrated secondary processing of contaminated material without sacrificing recovery and purity at MRFs.

SUMMARY OF THE DISCLOSURE

To achieve these and other objects and to meet these and other needs, and in view of its purposes, the present disclosure provides an automated process for separating and recycling a broad mix of waste material including, but not limited to, paper and flexible plastics. The process begins by collecting the broad mix of waste material at a materials recovery facility (MRF). The broad mix of waste material is presorted at the MRF and separated into individual commodities. The MRF separates partially processed 2D blends from 3D containers, while refraining from any quality control of the 2D blends, then bales the partially processed 2D blends. A fiber center receives the bales from the MRF and aggregates the partially processed 2D blends. Recyclable commodities, including flexible plastics, are removed from the 2D blends at the fiber center. Each recyclable commodity that is removed from the 2D blends is aggregated, and separate commodity streams of clean paper and clean flexible plastics are formed for sale by the fiber center. Separate streams of clean recycled paper having a purity of at least about 98% and clean recycled flexible plastics are created. Also provided are a related fiber center (and a hub and spoke infrastructure including the center) and at least one computer-readable non-transitory storage medium embodying software for performing the process.

The hub and spoke infrastructure incorporates multiple MRFs and fiber centers for separating and recycling a broad mix of plastic waste material including, but not limited to, paper and flexible plastics. The infrastructure includes three, main components: (1) a plurality of materials recovery facilities that collect a first portion of the broad mix of plastic waste material and create partially processed 2D blends; (2) a number of recycling facility/transfer stations that both (2a) collect a second portion of the broad mix of plastic waste material and create partially processed 2D blends and (2b) receive from at least one materials recovery facility the partially processed 2D blends created by the at least one materials recovery facility; and (3) multiple of the integrated fiber centers. Each fiber center collects the partially processed 2D blends from one or more of the plurality of materials recovery facilities, from one or more of the recycling facility/transfer stations, or from both one or more of the plurality of materials recovery facilities and one or more of the recycling facility/transfer stations and each fiber center is configured to aggregate the partially processed 2D blends, remove recyclable commodities including flexible plastics from the 2D blends, and aggregate each recyclable commodity that is removed from the 2D blends and form separate commodity streams of clean paper and clean flexible plastics for sale by the fiber center. Each of the multiple fiber centers is located geographically in relative proximity to the one or more materials recovery facilities, the one or more recycling facility/transfer stations, or to both the one or more materials recovery facilities and the one or more recycling facility/transfer stations from which the fiber center collects the partially processed 2D blends.

The at least one computer-readable non-transitory storage medium embodies software that is operable when executed to: (a) collect a broad mix of waste material including, but not limited to, paper and flexible plastics at a materials recovery facility; (b) presort the broad mix of waste material and separate at the materials recovery facility the broad mix of waste material into individual commodities; (c) separate at the materials recovery facility partially processed 2D blends from 3D containers while refraining from any quality control of the 2D blends; (d) bale at the materials recovery facility the partially processed 2D blends to form bales of partially processed 2D blends; (e) receive the bales from the materials recovery facility and aggregate at a fiber center the partially processed 2D blends; (f) remove recyclable commodities, including flexible plastics, from the 2D blends at the fiber center; and (g) aggregate each recyclable commodity that is removed from the 2D blends and form separate commodity streams of clean paper and clean flexible plastics for sale by the fiber center, wherein separate streams of clean recycled paper having a purity of at least about 98% and clean recycled flexible plastics are created.

The present disclosure teaches a function of automation with a defined process which presents considerable advantages over known technology. The advantages include scalability, higher mix recyclable recovery, greater circularity, safety, and efficiency. It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE DISCLOSURE

In this specification and in the claims that follow, reference will be made to a number of terms which shall be defined to have the following meanings ascribed to them.

The term "about" means those amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for components and steps, and ranges thereof, are for illustration only; they do not exclude other defined values or other values within defined ranges. The components and method steps of the disclosure include those having any value or any combination of the values, specific values, more specific values, and preferred values described.

The indefinite article "a" or "an" and its corresponding definite article "the" as used in this disclosure means at least one, or one or more, unless specified otherwise. "Include," "includes," "including," "have," "has," "having," "comprise," "comprises," "comprising," or like terms mean encompassing but not limited to, that is, inclusive and not exclusive.

Figure 1:
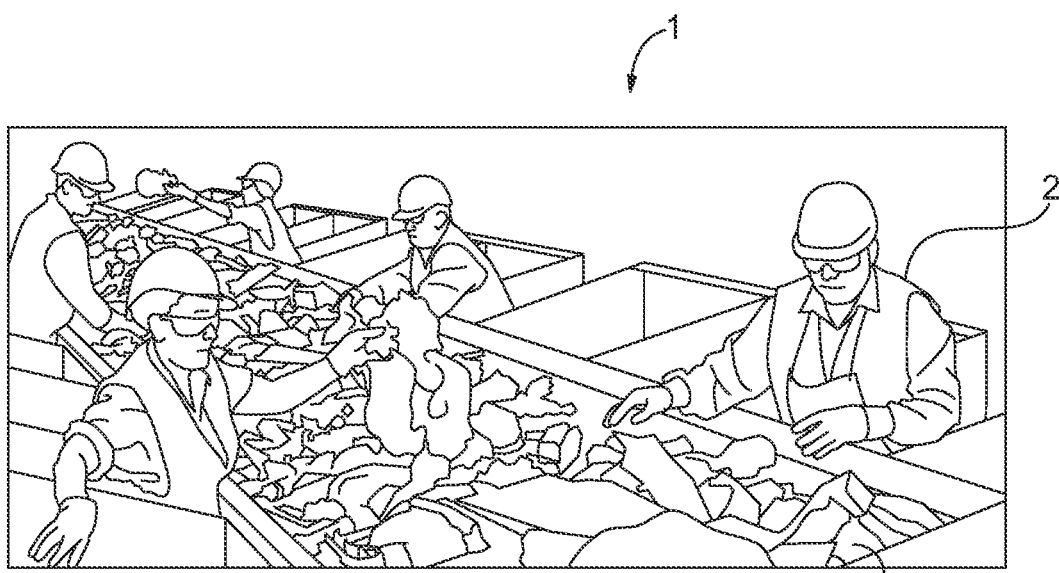
FIG. 1 illustrates the manual step of the conventional recycling process, in which workers process recyclable materials.
Figure 2:
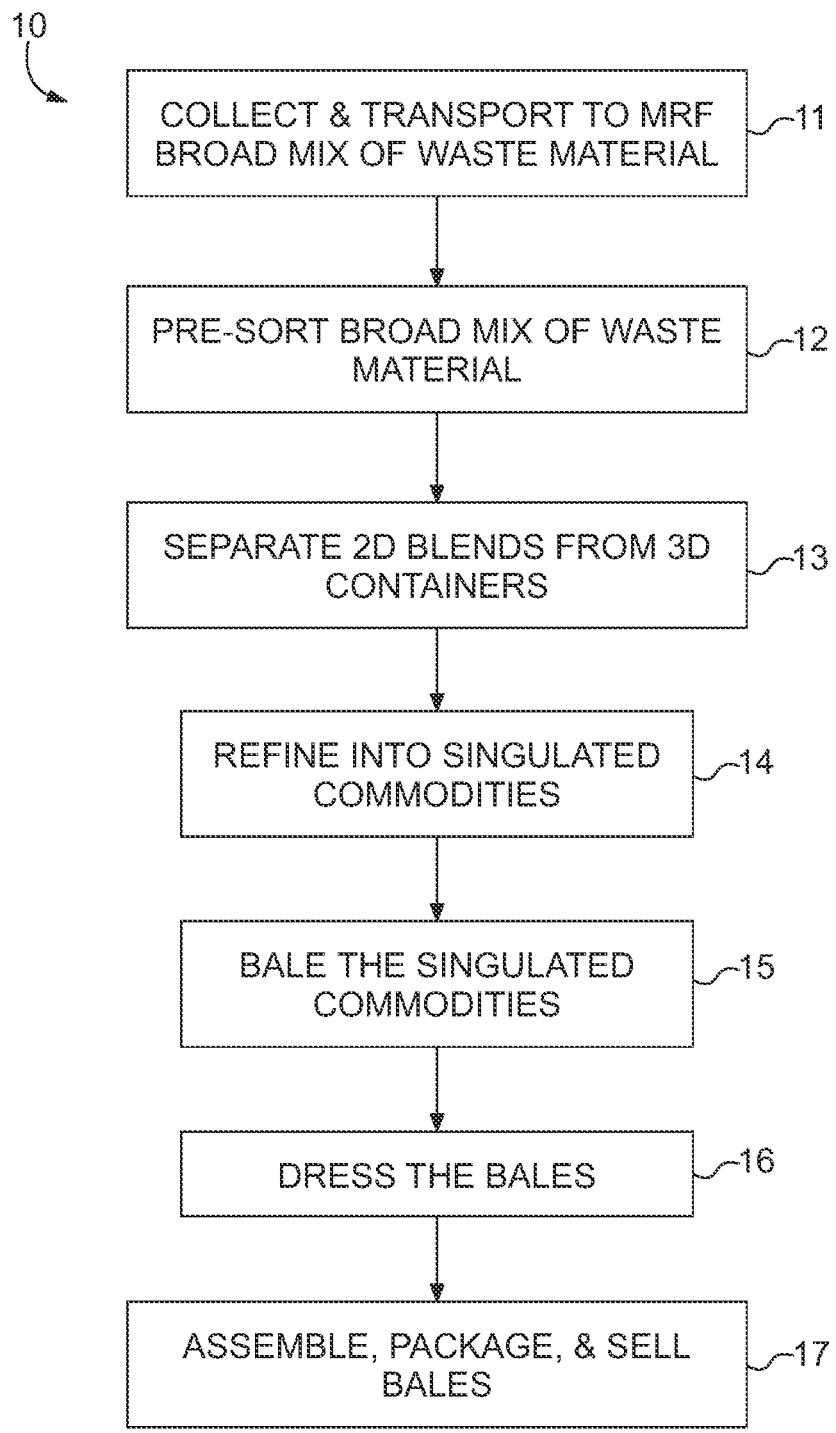
FIG. 2 shows an overview or flow chart illustrating a process used by MRFs for separating and recycling a broad mix of waste material.

Referring now to the drawing, in which like reference numbers refer to like elements throughout the various figures that comprise the drawing, FIG. 2 shows an overview or flow chart illustrating a process 10 used by MRFs for separating and recycling a broad mix of waste material. The process 10 includes separating individual recyclable commodities (paper, plastic, metal, cardboard, glass) mechanically. Mechanical separation is typically accomplished by physical characteristics (size, flexibility, shape, weight, dimension). For example, commodities of the mixed waste material can be separated into 2D blends and 3D containers. The terms 2D and 3D are used to indicate dimensions. A dimension is any measurable spatial extent, such as length, breadth, height, depth, width, thickness, and the like. Essentially, dimension indicates any and all sides of an object, such as length, height, and width, and allows measurement of the object. The term 2D stands for two-dimensional; the term 3D, for three-dimensional. In the context of this disclosure, 2D represents a relatively flat or thin object (such as a piece of paper or a plastic bag) primarily having just two dimensions (length and width), while 3D represents an object (such as a box or container in the shape of a cylinder, sphere, cube, pyramid, prism, etc.) having three significant dimensions (length, width, and height).

A brief discussion of recycling efforts directed to three recyclable commodities follows, including cardboard, paper, and plastics, to provide context for further disclosure about the process 10 and an improved process 100.

A. Cardboard (OCC) Recycling

The term "cardboard" refers to post-use corrugated packaging material. Industry insiders know this product as Old Corrugated Cardboard/Containers (OCC). Recycling and waste haulers often use the term OCC in reference to cardboard. Corrugated cardboard can easily be recognized by its multiple layer structure: a fluted or wavy middle layer is disposed between sheets of paper. This structure keeps corrugated board light and gives it the strength to carry products. If OCC is kept dry and clean, recycling is straightforward as long as all non-paper materials such as bubble wrap, wood skids, plastic bags, plastic wrapping, and closed-cell extruded polystyrene foam (XPS) are removed. (Styrofoam is a trademarked brand of XPS manufactured by The Dow Chemical Company.)

The size and type of business can have a strong bearing on OCC generation. Studies suggest that this material can represent as much as 40 percent or more of solid waste in a retail establishment and 15 percent or more of solid waste generated in an office setting. A small convenience store is estimated to produce between 700-1,000 lbs of OCC per month, while grocery supermarkets generate between 8-30 tons and department stores generate 8-20 tons during that time span.

For small businesses which generate a comparatively small amount of OCC, bundling OCC manually, storing the loose OCC in a suitable container, and having it collected by a hauler are ideal steps. On the other hand, businesses which generate a large amount of OCC often use large storage containers and compact or bale it using an industrial baler for the efficient transportation of OCC to recycling centers. One emerging technology is the use of shredding in combination with compaction or baling to increase the density of material for transport.

Recycling corrugated containers is relatively straightforward. It involves diverting old cardboard from waste streams, the elimination of contaminants, and the flattening or compressing of material to promote ease of handling, storing, delivering the stock to a paper production mill or processor where it is processed into different paper products such as recycled paperboard, the center fluting of corrugated boxes, and unbleached craft paperboard. On average, a corrugated box contains roughly 50 percent recycled fiber. About 51 percent of OCC is used to make new corrugated board, while 11.5 percent is used for boxboard materials such as cereal boxes. About 32 percent of recycled OCC is exported.

Depending upon the amount of OCC generated, the selling relationship will vary. Large generators may deal directly with paper companies, while mid-level generators may deal with recycling companies, and very small generators may sell to smaller operators acting to aggregate material for sale. No matter how much OCC is generated, it is important to recycle.

There are a number of benefits to recycling OCC instead of discarding it. Recycling OCC reduces energy and water usage and the production of greenhouse gas and certain air pollutants like total reduced sulfur (TRS), volatile organic chemicals (VOCs), and hazardous air pollutants (HAP). The recycling of cardboard also reduces demand for virgin timber. It takes approximately three tons of trees to manufacture just one ton of virgin cardboard. Recycling helps reduce waste tipping fees as well. The recycling of one ton of cardboard saves more than nine cubic yards of landfill space.

B. Paper Recycling

Paper recycling is the circular process of turning old waste paper into new paper. This recycling and producing process is called papermaking. Paper is a 100% natural and recyclable resource made of wood fibers. Therefore, paper waste is the most important ingredient for the process of creating new paper products.

There are two, main, source streams of paper waste: (1) residential or household waste paper; and (2) industrial, commercial, or confidential waste paper. Household waste paper includes a mix of paper waste containing old newspapers, printer paper, magazines, junk mail, and paperboard packaging. Confidential waste paper includes printed documents with sensitive information on them, such as personal data. Most of these documents end up in a paper shredder. This shredded waste paper is an important resource for the tissue industry.

Paper recycling begins when paper waste is separated from other recyclables and garbage. Typically, a local waste hauler collects the old paper from centralized drop-off containers in a particular area or the curbside collection or picks up containers that get emptied at scheduled times. The paper material is then transferred to a MRF. At the MRF, sortation is done during which contaminations are removed from the paper, such as plastic, wood, or other foreign materials. The sortation process is partially done by machine but also by hand. The sorted waste commodities are baled for further transport. Not every MRF bales the waste. Some opt to deposit the material in large containers to be transported to customers such as paper mills.

C. Plastics Recycling

Plastics are inexpensive, lightweight, and durable materials, which can readily be molded into a variety of products that find use in a wide range of applications. As a consequence, the production of plastics has increased markedly over the last 60 years. Plastics are ubiquitous in common products, such as linear low density polyethylene (LLDPE) and low density polyethylene (LDPE) films, polypropylene (PP) strapping, high density polyethylene (HDPE) crates, polystyrene (PS) foam, and the like.

Unfortunately, current levels of plastics usage and disposal generate several environmental problems. About 4 percent of world oil and gas production, a non-renewable resource, is used as feedstock for plastics and a further 3-4% is expended to provide energy for their manufacture. A major portion of plastics produced each year is used to make disposable items of packaging or other short-lived products that are discarded within a year of manufacture. These two observations alone indicate that our current use of plastics is not sustainable. In addition, substantial quantities of discarded end-of-life plastics are accumulating as debris in landfills and in natural habitats worldwide because of the durability of the polymers involved.

Recycling is one of the most important actions currently available to reduce these impacts and represents one of the most dynamic areas in the plastics industry today. Recycling provides opportunities to reduce oil usage, carbon dioxide emissions, and the quantities of waste requiring disposal. Although plastics have been recycled since the 1970s, the quantities that are recycled vary geographically, according to plastic type and application. Recycling of packaging materials has seen rapid expansion over the last decades in a number of countries. Advances in technologies and systems for collecting, sorting, and reprocessing recyclable plastics are needed to create new opportunities for recycling, and with the combined actions of the public, industry, and governments it may be possible to divert the majority of plastic waste from landfills to recycling over the next decades.

One specific subset of plastics, namely flexible plastics, is especially problematic during recycling. Distinguish flexible plastics, which can bend easily without breaking, from rigid plastics, which are unable to bend or be forced out of shape. Flexible plastic films are increasingly used in many applications due to their lightness and versatility. Currently, in developed countries, about 50% of plastics in domestic waste are flexible plastic films.

The unique problem posed by flexible plastics during recycling has several aspects. First, flexible plastics share with paper many of the same physical characteristics that are used to sort the different waste materials. Therefore, flexible plastics are often co-mingled with paper even after sortation. And separation of flexible plastics from paper is labor intensive (sort manual labor is needed), capital inefficient (due to additional optical sorters), and difficult to accomplish. Manual separation of flexible plastics from paper at MRFs is not very effective. Optical sorters used to separate flexible plastics from paper streams are insufficient to generate a plastic commodity stream, so that most MRFs remove flexible plastics from the paper stream and discard the flexible plastics. Thus, the flexible plastics are residue in paper (fiber) streams and are not treated as a recyclable commodity. The problem is exacerbated by the current increase in the use of flexible plastics and decrease in paper usage.

D. The Process 10

Returning to FIG. 2, the process 10 begins in Step 11 when a broad mix of waste material is collected and transported to an MRF. The waste material can comprise a residential single stream (RSS), industrial waste, commercial waste, or a combination. RSS is a stream in which all recyclable materials (plastics, metals, paper, cardboard, and others) are placed, unsorted, in a single stream. Step 12 of the process 10 involves presorting the broad mix of waste material. Presorting includes two steps: a negative sort which removes undesired contaminants, and a positive sort which recovers or captures separate materials such as cardboard and glass. During Step 12, the broad mix of waste material is separated (or singulated) into individual commodities (paper, plastic, metal, cardboard, glass) mechanically according to physical characteristics and removed from the stream.

The second Step 12 of the process 10 also involves removal from the broad mix of waste material of contamination. Example contaminants include ammunition, paint, automotive fluids, car batteries, pesticides, and other hazardous waste that can poison, corrode, explode, or burst into flame when handled improperly. Other example contaminants include ceramics; mirrors; laboratory and Pyrex glass; syringes, needles, sharps, and medical waste; liquids in containers; and food waste. Certain non-recyclable plastics may constitute contaminants because stable, profitable markets do not currently exist for such plastics.

In Step 13 of the process 10, 2D blends are separated from 3D containers. The third Step 13 of the process 10 imperfectly separates 2D blends from 3D containers. Although the majority of the 2D blends comprises 2D recyclables, the 2D blends also include some amount of 3D containers. Similarly, although the majority of the 3D containers comprises 3D containers, the 3D containers also include some amount of 2D recyclables.

3D containers can be separated during Step 13 by one or more of a number of techniques. For example, powerful magnets can be used to separate and remove steel and iron commodities from the broad mix of waste material because steel and iron are magnetic. Eddy current separators can be used to separate and remove non-ferrous metallic commodities such as aluminum from the broad mix of waste material. An eddy current separator has a magnetic rotor, with alternating polarity, that spins rapidly inside a non-metallic drum driven by a conveyor belt. When non-ferrous metals pass over the drum, the alternating magnetic field creates eddy currents in the non-ferrous particles to repel the material away from the conveyor and the remaining material drops off at the end of the conveyor. Often manual labor is required to assure quality control of the non-ferrous metallic commodities after they are separated and removed from the broad mix of waste material.

3D plastic containers made of plastic can also be separated during Step 13. There are a number of possible embodiments that can be used to separate and remove 3D plastic containers from the broad mix of waste material. Regardless of the embodiment, often manual labor is required to assure quality control of the plastic 3D containers after they are separated and removed from the broad mix of waste material. In one embodiment, manual sorting labor is used to separate and remove 3D plastic containers from the broad mix of waste material.

In a second embodiment, an optical sorter is, or a series of optical sorters are, used. Optical sorting (sometimes called digital sorting) is the automated process of sorting solid products using cameras, lasers, or both cameras and lasers. Depending on the types of sensors used and the software-driven intelligence of the image processing system, optical sorters can recognize the color, size, shape, structural properties, and chemical composition of an object. The sorter compares objects to user-defined accept/reject criteria to identify and separate products of different types of materials. Optical sorting achieves non-destructive, almost 100% inspection and sorting at full production volumes. Compared to manual sorting, which is subjective and inconsistent, optical sorting helps improve product quality, maximize throughput, and increase yields while reducing labor costs.

In a third embodiment, an air separation device is used. The air separation device applies variable airflow and variable vacuum to control separation of materials of different density including, but not limited to light fraction (plastic) from heavy fraction (e.g., OCC). A suitable air separator is available from Walair B. V. of The Netherlands. The air separation device is configured to split or separate a waste stream into a heavy fraction and a light fraction stream.

The example air separation device operates as follows. A fast-running input conveyor delivers the waste material to a horizontal air separator. The input conveyor may have an effective width of about 1,200 millimeters. The speed of the input conveyor may be adjustable between 80-120 meters/minute. The air separator includes an air transport duct. The separation of the light from the heavy fractions takes place as the combined materials fall (under the force of gravity) in an adjustable airstream of the air separator. A short chute of the air separator transports the heavy fraction to a heavy fraction conveyor, which directs the heavy fraction (OCC) away from the air separator.

The separated light fraction (plastic) is transported by a round transport duct to a material separator where the air and the light fraction are separated. The material separator is installed on a steel support beam. The material separator includes an expansion area with a chute and a rotary valve. The rotary valve transports the light fraction, without pressure, to a light fraction conveyor or container.

The air outlet opening of the material separator is connected by a suction duct to a fan separator. The outlet of the fan separator is connected by an air regulation valve to both the blow inlets of an air sieve. The air/dust outlet of the fan separator is connected by a transport duct to a dust filter. In this closed circuit the fractions are transported without touching the ducts or the fan separator. Thus, the risk of blocking or wearing the components of the air separation device is reduced to a minimum.

It is possible to regulate the air capacity of the fan separator, as desired, using two air regulation valves within the suction duct of the fan separator. Another option is to connect the fan separator to a frequency regulator. Also the air blown to the air separator and the capacity of the air/dust outlet can be adjusted by a regulation valve. The fan separator sucks 100%, blows 70/80%, and transports 20/30%% of the air to the dust filter. Applying the principles of blowing and suction, the air separation device achieves an excellent separation of the light fraction (plastic) and heavy fraction (OCC) materials. The results of the separation also depend on the dosage and distribution of the supplied fractions to the input conveyor.

Regardless of how the third Step 13 of the process 10 is implemented, whether using one or a combination of human labor, magnets, eddy current separators, optical sorters, air separation devices, or other equipment, at the completion of the Step 13 the various 3D containers are separated and removed from the broad mix of waste material.

The third Step 13 of the process 10 also separates 2D blends from the broad mix of waste material. The majority of the 2D blends comprises mixed paper and sorted residential paper and news (SRPN). Separation of the 2D blends from the broad mix of waste material typically is achieved using one of two alternative techniques. First, screens and optical sorters can be used. Often manual labor is required to assure quality control of the 2D blends after they are separated and removed from the broad mix of waste material. In any case, the residue (largely flexible plastics) that is removed from the 2D blends during this quality control assurance is largely discarded.

Alternatively, separation of the 2D blends from the broad mix of waste material can be achieved using multiple optical sorters. This alternative technique avoids or at least minimizes the need for manual labor to assure quality control. Regardless, the residue (largely flexible plastics) that is removed from the 2D blends still is largely discarded. Flexible plastics are removed and discarded both because they have insufficient commercial value absent aggregation to form large amounts and because they tend to clog the machinery and equipment used in recycling.

Figure 3:
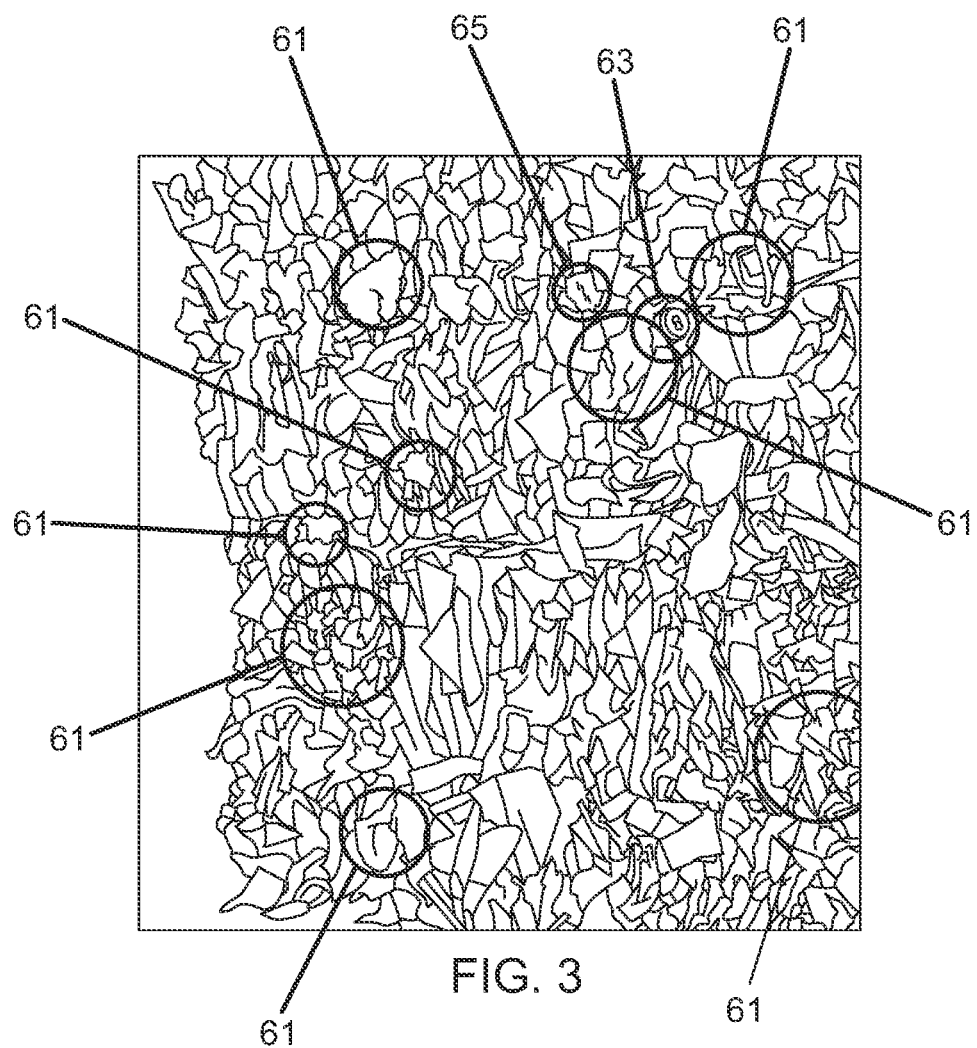
FIG. 3 illustrates the relative impurity of paper achieved after sorting using the process outlined in FIG. 2.

The fourth Step 14 of the process 10 refines the singulated commodities (e.g., glass, OCC, 2D blends, and 3D containers) to remove residue through manual, robotic, and optical sortation. About 25-50% of the total labor at a MRF is used for sorting. Despite the best attempts to improve sorting during the process 10 such that the singulated commodities are of high quality and purity and, therefore, have a high economic value, the paper quality is often less than desired. More specifically, and for example, only 10% of the paper may have a purity of 98% or more; 80% of the paper may have a purity between 90-98%; and 10% of the paper may have a purity of less than 90%. FIG. 3 illustrates the relative impurity of paper achieved after sorting using the process 10 outlined in FIG. 2, showing that the paper includes impurities such as flexible plastic film 61, aluminum beverage containers 63, and PET 65. The impurities present in the paper limit the use of the product by paper mills and create a significant financial burden due to transporting, cleaning, and disposing of the impurities by the MRF. The impurities also limit the export market for the paper.

The fifth Step 15 of the process 10 bales each type of singulated commodity into finished goods for sale by the MRF. In the sixth Step 16 of the process 10, the MRF "dresses" the bales as needed to improve their cosmetic appearance before shipment of the bales to a customer. Bales are dressed depending on feedback received by the MRF from the end market customers. The Step 16 of dressing includes a slow, manual process of closely examining each bale and removing (often prying) surface contaminants from the bale. Mixed paper and SRPN require the most attention. Finally, in Step 17 of the process 10, the dressed bales are assembled, packaged, and sold to the market.

E. The Improved Process 100

The improved process 100 described below addresses a number of problems identified in the process 10 described above (as implemented at MRFs). First, the need for manual labor to assure quality control of the 2D blends after they are separated and removed from the broad mix of waste material is eliminated, yet the purity of the 2D blends is improved. Second, the process 100 eliminates step 14 (refining) and step 16 (bale dressing) of the process 10. Finally, the flexible plastics that are removed from the 2D blends and discarded by the MRF during the process 10 are no longer discarded in the process 100.

Figure 4:
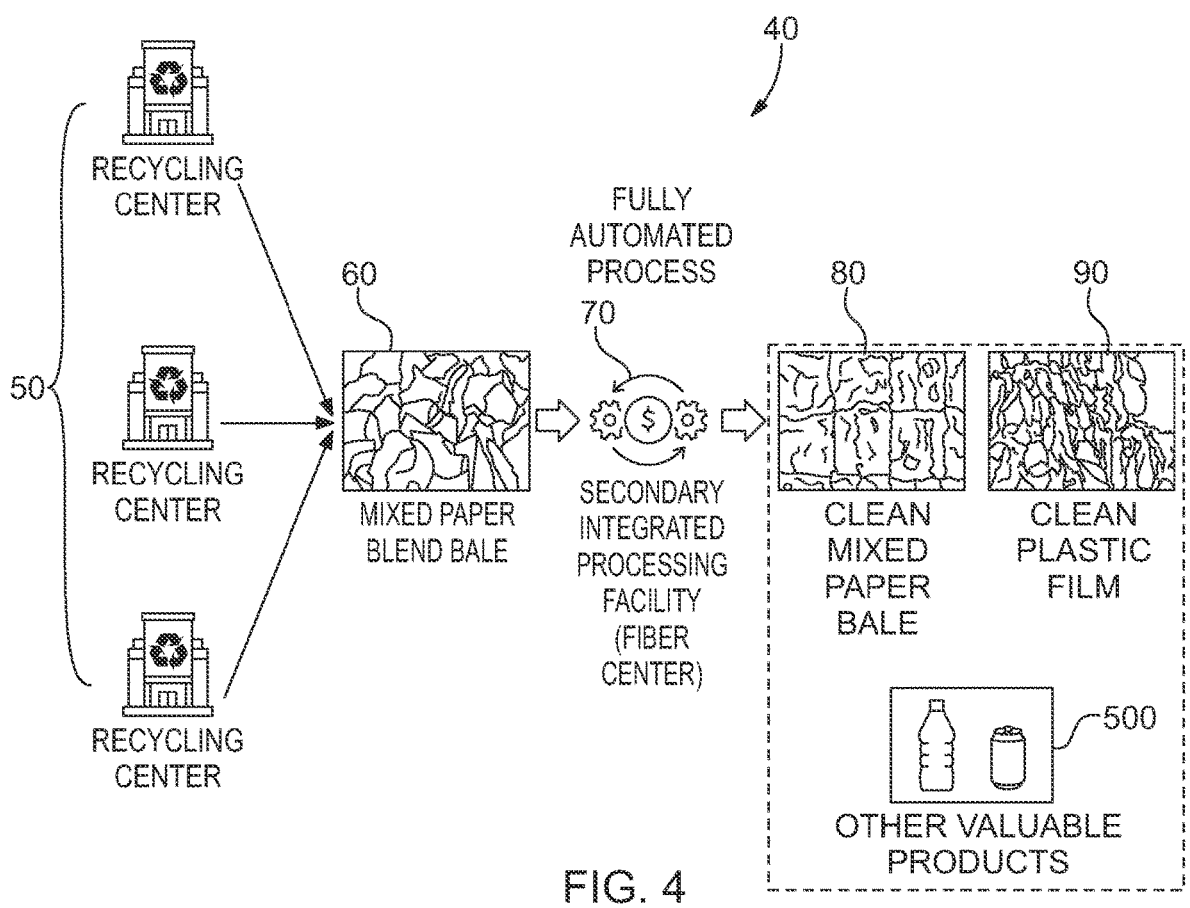
FIG. 4 shows an overview of an operating model including an integrated fiber center according to the present disclosure.

FIG. 4 shows an overview of an operating model 40 including a secondary integrated processing facility or fiber center 70 according to the present disclosure. The operating model 40 begins by collecting mixed paper blend bales (which are a subset of 2D blend bales 60) from MRFs 50. Although three MRFs 50 are shown in FIG. 4, any number of MRFs 50 can be included in the operating model 40. As shown in FIG. 4, the fiber center 70 receives the mixed paper blend bales from the MRFs 50. At the fiber center 70, various steps of the process 100 are applied according to the present disclosure which are discussed in detail below. The process 100 sorts, cleans, and processes the mixed paper blend bales into intermediate products including a clean mixed paper bale 80 and a clean plastic film 90. The clean plastic film 90 can be used, in turn, to manufacture products 500 such as plastic bottles and containers.

Figure 5:
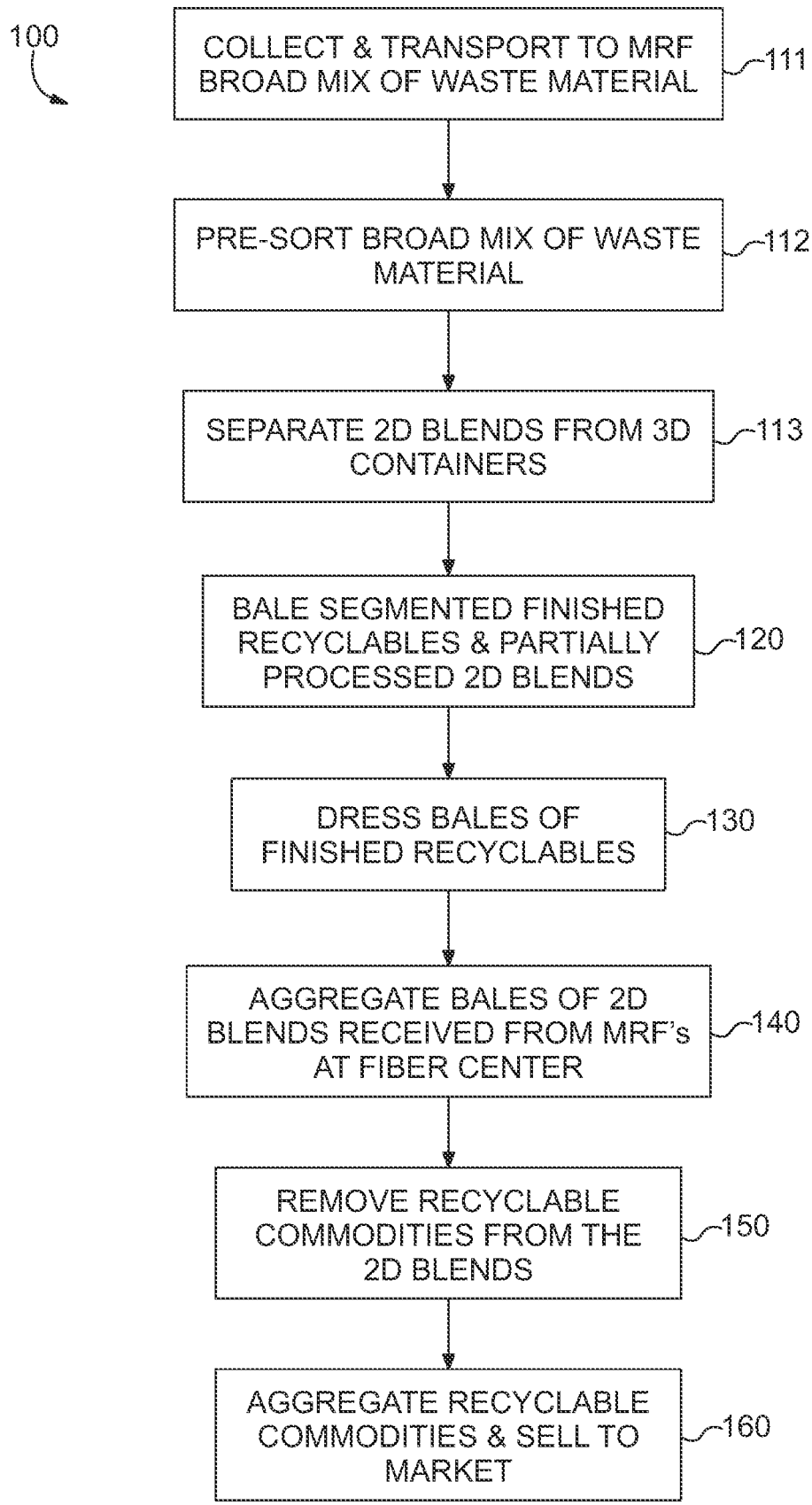
FIG. 5 shows an overview or flow chart illustrating an improved process that uses the fiber center for separating and recycling a broad mix of waste material.

FIG. 5 shows an overview or flow chart illustrating the process 100 that uses the fiber center 70 for separating and recycling a broad mix of waste material. Like the process 10, the process 100 begins in Step 111 when a broad mix of waste material is collected and transported to an MRF 50. The waste material can comprise a residential single stream, industrial waste, commercial waste, or a combination. Like the Step 12 of the process 10, the second Step 112 of the process 100 involves presorting the broad mix of waste material. As stated above, presorting includes two steps: a negative sort which removes undesired contaminants, and a positive sort which recovers or captures separate materials such as cardboard and glass. During Step 112, the broad mix of waste material is separated (or singulated) into individual commodities (paper, plastic, metal, cardboard, glass) mechanically according to physical characteristics and removed from the stream.

Like the Step 13 of the process 10, 2D blends are separated from 3D containers in the Step 113 of the process 100. The third Step 113 of the process 100 imperfectly separates 2D blends from 3D containers. Although the majority of the 2D blends comprises 2D recyclables, the 2D blends also include some amount of 3D containers. Similarly, although the majority of the 3D containers comprises 3D containers, the 3D containers also include some amount of 2D recyclables.

Unlike Step 13 of the process 10, Step 113 of the process 100 does not take any action to assure quality control of the 2D blends after they are separated and removed from the broad mix of waste material. Nor is any residue (largely flexible plastics) removed from the 2D blends or discarded. Otherwise, the first three steps (111, 112, and 113) of the improved process 100 illustrated in FIG. 5 are identical to the first three steps (11, 12, and 13) of the process 10 illustrated in FIG. 2 and discussed above. Upon the completion of the third Step 113, however, the improved process 100 diverges from the process 10.

In Step 120, the process 100 bales each type of segmented recyclable at the MRFs 50. More specifically, at the MRFs 50, bales are created for each type of finished recyclables (OCC, various types of metals, etc.). The partially processed mixed paper blend bales are also created at the MRFs 50. No additional equipment or manual sortation is needed to create the mixed paper blend bales. The mixed paper blend bales, which are mostly fiber, are stored at the MRFs 50 as an intermediate, partially processed product. Mixed paper and SRPN no longer exist as separate products at the MRFs 50, which eliminates all costs (especially labor) needed in the process 10 to create such products. Nor are the flexible plastics that are included in the 2D blend bales 60 discarded.

Figure 6:
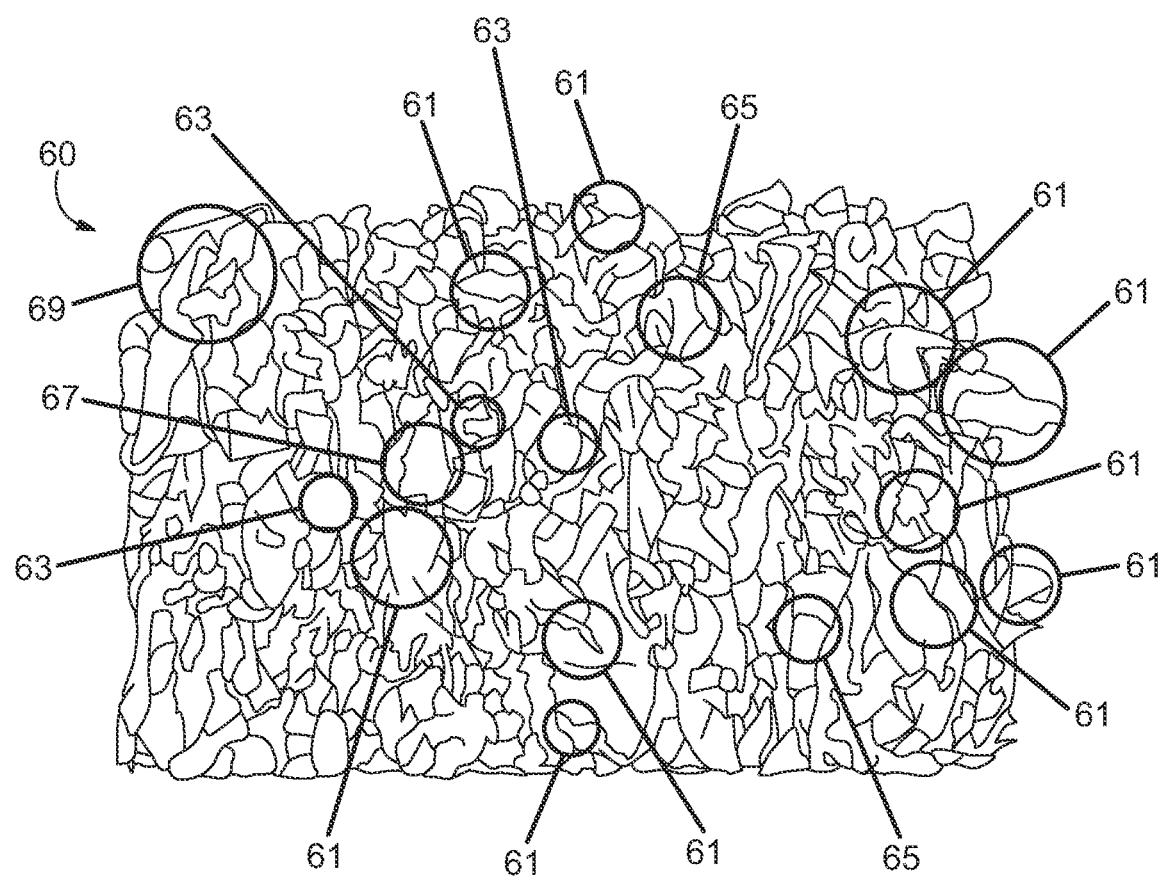
FIG. 6 illustrates one example of an intermediate, partially processed 2D blend bale.

FIG. 6 illustrates one example of the intermediate, partially processed 2D blend bale 60. The example 2D blend bale 60 includes, as shown, flexible plastic film 61, aluminum beverage containers 63, PET 65, steel and tin cans 67, and trash 69. As shown in FIG. 4, the MRFs 50 send the partially processed 2D blend bales 60 to the fiber center 70 without further processing of the 2D blend bales 60 at the MRFs 50.

In the fifth Step 130 of the process 100, the MRF 50 "dresses" the bales of finished recyclables (e.g., 3D containers) as needed to improve their cosmetic appearance before shipment of the bales to a customer. Bales are dressed depending on feedback received by the MRF 50 from the end market customers. The Step 130 of dressing includes a slow, manual process of closely examining each bale and removing (often prying) surface contaminants from the bale. Because mixed paper and SRPN do not exist as separate bales at the MRFs 50 during the process 100, these recyclables are not addressed in Step 130. Nor are the 2D blend bales 60 dressed at the MRFs 50.

Figure 7:
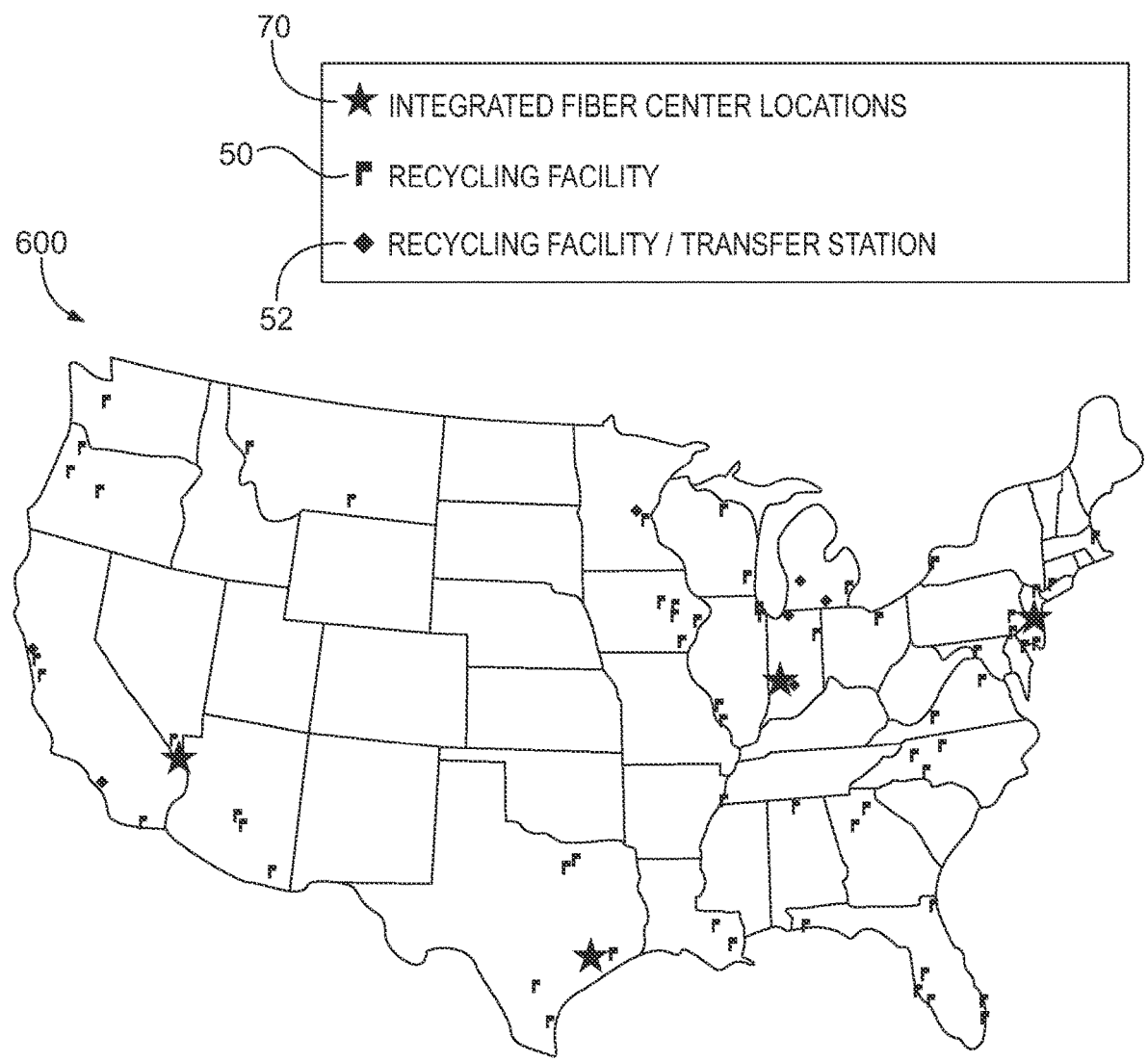
FIG. 7 illustrates an example embodiment of a nationwide hub and spoke infrastructure for recycling a broad mix of paper and flexible plastic waste material made possible by the integrated fiber center according to the present disclosure.

In the sixth Step 140 of the process 100, the fiber center 70 receives the partially processed 2D blend bales 60 from multiple MRFs 50 and aggregates the 2D blend bales 60. Thus, the fiber center 70 acts as a hub and the MRFs 50 act as the spokes in a hub-and-spoke model for downstream integrated processing of the partially processed 2D blend bales 60. FIG. 7 illustrates an example embodiment of a nationwide hub and spoke infrastructure 600 for recycling a broad mix of paper and flexible plastic waste material made possible by the integrated fiber center 70. As illustrated, a plurality of integrated fiber centers 70 can be located in selected cities around the country. Four locations are shown, one each in the North, South, East, and West. Four locations constitute merely one example; the number of locations may vary depending on many factors as would be known to an artisan. The locations of the integrated fiber centers 70 should be selected to provide coverage across the United States around existing MRFs 50 and build geographic density.

Each integrated fiber center 70 receives the 2D blend bales 60 from a number of MRFs 50. To facilitate transportation of the 2D blend bales 60 from the MRFs 50 to a particular integrated fiber center 70, the MRFs 50 that provide 2D blend bales 60 to a particular integrated fiber center 70 are located in relative geographic proximity to the integrated fiber center 70. Thus, for example, the MRFs 50 that provide 2D blend bales 60 to the integrated fiber center 70 in the West are located in the Western part of the United States (eleven such MRFs 50 are shown in this example). A plurality of recycling facility/transfer stations 52 can be included to receive 2D blend bales 60 from another MRF 50 and relay that material to the proximate integrated fiber center 70 along with the 2D blend bales 60 collected by the recycling facility/transfer station 52 itself. The recycling facility/transfer stations 52 further facilitate transportation of the 2D blend bales 60 from the MRFs 50 to the integrated fiber centers 70.

The hub and spoke infrastructure 600 offers several advantages. Among those advantages are that the hub and spoke infrastructure 600: leverages economies of scale and aggregates mixed paper and flexible plastics from several recycling facilities and sorts them into purified recycled streams for end-customers; provides configurable lines to address stream complexity; simplifies paper and flexible plastics handling at existing recycling centers by shifting complex processing into a centralized facility (i.e., the inverse of a manufacturing-to-distribution warehousing model); reduces capital expenditure and operating expenditure at recycling facilities; and homogenizes curbside programs across feeder markets regardless of local recycling processing capabilities through centralizing complexity at the recycling facility location. In short, the hub and spoke infrastructure 600 aggregates volume at scale and captures the upside value for recycled paper and flexible plastics.

Recycling facilities currently face tradeoffs between recovery and purity. The more waste material that is recovered, the greater is the need for quality management. Conversely, if higher-quality products need to be shipped, more desirable material will be missed and will find its way to the residue. This disclosure eliminates the tradeoff by introducing a process of integrated secondary processing of contaminated material without sacrificing recovery and purity at MRFs. The integrated process also permits simultaneous handling of paper and flexible plastics.

The disclosed integrated process 100, infrastructure 600, and related business model simplify the primary processing at the MRFs 50. The result is smaller footprint MRFs 50 with lower capital and operating expenses, creating the potential for the MRFs 50 to serve small volume markets that cannot be served today. Capital efficiency is gained by processing a large volume of relatively pure inbound streams rather than a small volume that is generated in individual recycling center nodes. A specialized separation is enabled due to sufficient volume of each contaminant generated at the hub. In particular, smaller MRFs 50 (which have relatively low throughput and low volume) are not candidates for robotics, optical sortation, and other efficiencies.

The process 100, infrastructure 600, and related business model capture the most possible paper and flexible plastics with the highest possible quality while using existing infrastructure (e.g., the MRFs 50) and adding an integrated secondary processing infrastructure (e.g., the regional hub and spoke model). A higher recovery rate of paper is achieved with lower amounts of contaminants through the specialized refining steps of the process 100. The contaminant stream is largely comprised of recyclable materials that had been discarded previously. Thus, produced are high-recovery flexible plastics and high-purity paper.

Figure 6A:
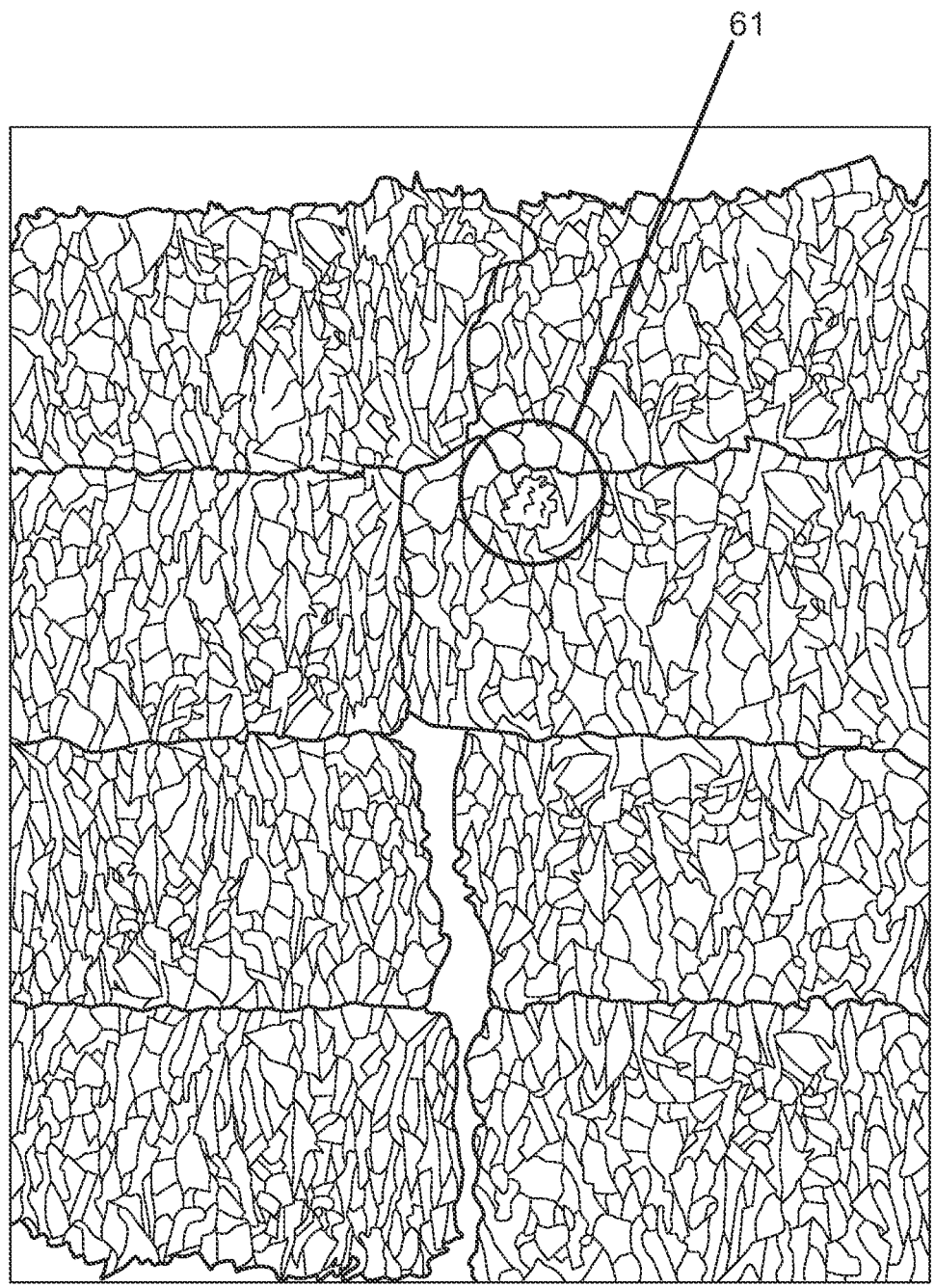
FIG. 6A illustrates the purity of paper that may be achieved after using the improved process outlined in FIG. 5.

The fiber center 70 has a high degree of automation including but not limited to optical sorters, robotics, artificial intelligence/machine learning (see below), ballistic separators, air knives, and disc screens to thoroughly clean the aggregated 2D blend into the highest value end products. The automation of the fiber center 70 allows the process 100, in Step 150 of the process 100, to remove recyclable commodities from the 2D blend bales 60. Such recyclable commodities constitute impurities or contaminants in the 2D blend bales 60, but are captured and processed at the fiber center 70 to maximize both recovery rate and commodity purity. Among the recyclable commodities removed from the primary fiber stream are PET containers, aluminum, carboard (OCC), tin/steel, LDPE film, HDPE film, HDPE containers, PP film, PP containers, SRPN, mixed paper, and more. Any one of these recyclable commodities can, after having been removed, be further processed into subsets of materials (e.g., SRPN could be processed into white ledger, coated groundwood sections, and others). FIG. 6A illustrates the purity of paper (showing the inclusion in the paper of only one flexible plastic film 61) that may be achieved after using the improved process 100 outlined in FIG. 5. The process 100 of the present disclosure produces paper having a purity greater than about 98% (compare this purity to the purity achieved using the process 10 and illustrated in FIG. 3). Thus, the process 100 increases the purity of the recycled paper commodity by at least 5% or higher without the need for expensive labor, capital investment, or both directed to paper and SRPN sortation across multiple MRFs 50.

In the eighth Step 160 of the process 100, the fiber center 70 aggregates each recyclable contaminant (plastic, metal, cardboard) that is removed from the 2D blend bales 60. Each aggregated recyclable contaminant forms a separate commodity stream, such as the clean mixed paper bale 80 and the clean plastic film 90, that can be sold to the market. The aggregated flexible plastics can be further directed for downstream mechanical and chemical recycling. Manufacturers in the market can use these intermediate products to manufacture final products 500 such as plastic bottles and containers.

The process 100 can be analogized to a mining operation, with the MRFs 50 analogous to the mine where, for example, gold is collected. By analogy, the intermediate clean mixed paper bale 80 and the clean plastic film 90 (which can be made into final products 500) are the purified gold (which can be made into final products such as rings). The first three steps of the process 10 (Steps 11, 12, and 13) and the first three steps of the process 100 (Steps 111, 112, and 113) are analogous to collecting the impure gold and separating the gold (which includes impurities) from other rocks. The process 10 further refines the gold, removing impurities and discarding them, at the mine (or MRF 50). In contrast, the process 100 transports the gold (2D blend bales 60) to a refinery (the fiber center 70) which further refines the gold, removing impurities (such as flexible plastics) and using at least some of those impurities productively.

Figure 8:
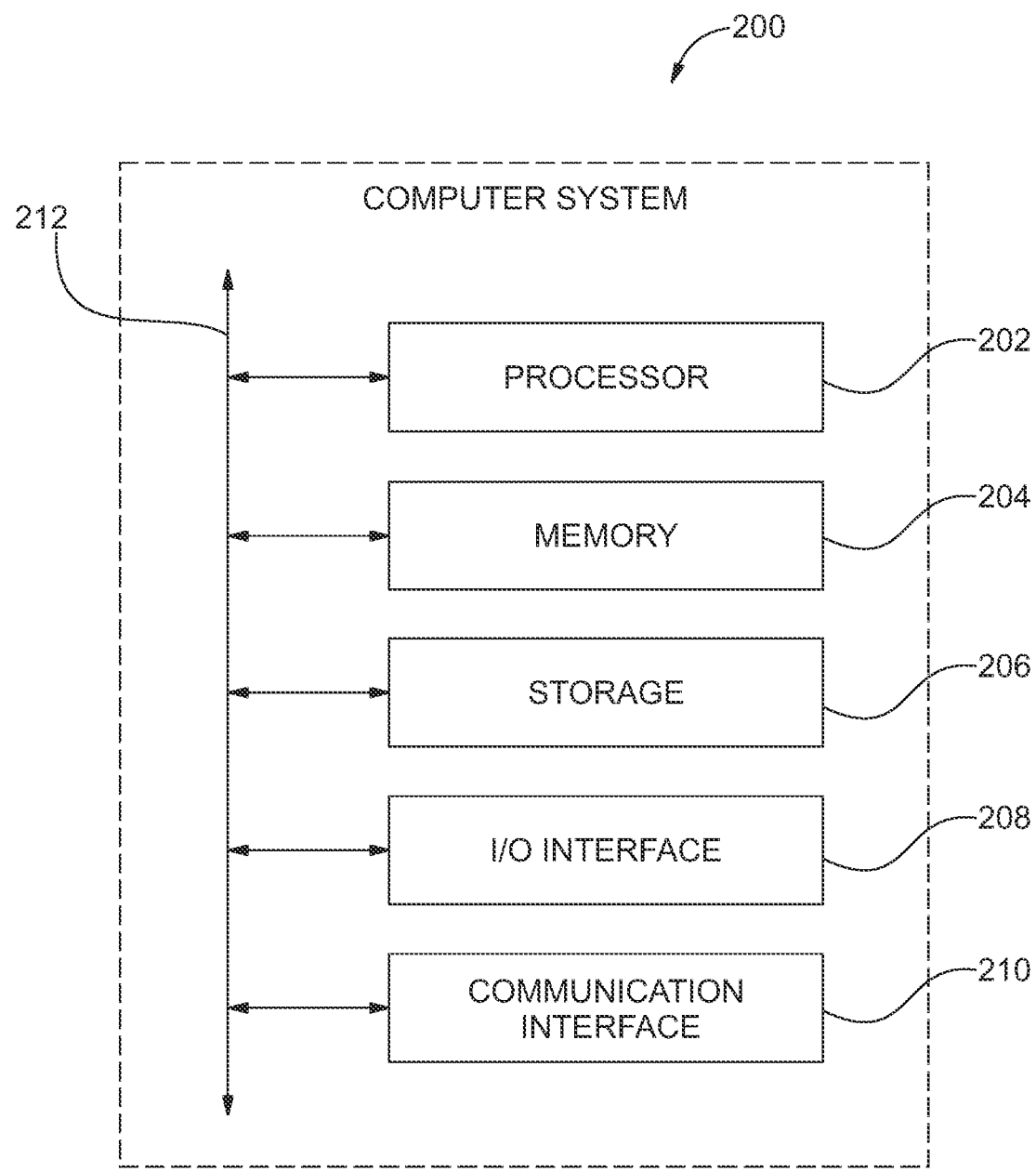
FIG. 8 illustrates an example computer system that can be used in the process according to the present disclosure.

FIG. 8 illustrates an example computer system 200 that can be used in the process 100. In other words, the computer system 200 can be used to control the various components (e.g., magnets, eddy current separators, optical sorters, air separation devices, robots, and other equipment—and the subcomponents and functionality of these various components) that combine to perform the process 100.

In particular embodiments, one or more computer systems 200 perform one or more steps of one or more embodiments of the process 100 described or illustrated in this document. In particular embodiments, one or more computer systems 200 provide functionality described or illustrated in this document. In particular embodiments, software running on one or more computer systems 200 performs one or more steps of one or more embodiments of the process 100 described or illustrated in this document or provides functionality described or illustrated in this document. Particular embodiments include one or more portions of one or more computer systems 200. In this document, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates the computer system 200 taking any suitable physical form. As example and not by way of limitation, the computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these devices. Where appropriate, the computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more embodiments of the process 100 described or illustrated in this document. As an example and not by way of limitation, the one or more computer systems 200 may perform in real time or in batch mode one or more steps of one or more embodiments of the process 100 described or illustrated in this document. The one or more computer systems 200 may perform at different times or at different locations one or more steps of one or more embodiments of the process 100 described or illustrated in this document, where appropriate.

In particular embodiments, the computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 202 includes hardware for executing instructions, such as those making up a computer program. As an example and not by way of limitation, to execute instructions, the processor 202 may retrieve (or fetch) the instructions from an internal register, an internal cache, the memory 204, or the storage 206; decode and execute them; and then write one or more results to an internal register, an internal cache, the memory 204, or the storage 206. In particular embodiments, the processor 202 may include one or more internal caches for data, instructions, or addresses. This disclosure contemplates the processor 202 including any suitable number of any suitable internal caches, where appropriate. As an example and not by way of limitation, the processor 202 may include one or more instruction caches, one or more data caches, and one or more translation lookaside buffers (TLBs). Instructions in the instruction caches may be copies of instructions in the memory 204 or the storage 206, and the instruction caches may speed up retrieval of those instructions by the processor 202. Data in the data caches may be copies of data in the memory 204 or the storage 206 for instructions executing at the processor 202 to operate on; the results of previous instructions executed at the processor 202 for access by subsequent instructions executing at the processor 202 or for writing to the memory 204 or the storage 206; or other suitable data. The data caches may speed up read or write operations by the processor 202. The TLBs may speed up virtual-address translation for the processor 202. In particular embodiments, the processor 202 may include one or more internal registers for data, instructions, or addresses. This disclosure contemplates the processor 202 including any suitable number of any suitable internal registers, where appropriate. Where appropriate, the processor 202 may include one or more arithmetic logic units (ALUs); be a multi-core processor; or include one or more processors 202. Although this disclosure describes and illustrates a particular processor, this disclosure contemplates any suitable processor.

In particular embodiments, the memory 204 includes main memory for storing instructions for the processor 202 to execute or data for the processor 202 to operate on. As an example and not by way of limitation, the computer system 200 may load instructions from the storage 206 or another source (such as, for example, another computer system 200) to the memory 204. The processor 202 may then load the instructions from the memory 204 to an internal register or internal cache. To execute the instructions, the processor 202 may retrieve the instructions from the internal register or internal cache and decode them. During or after execution of the instructions, the processor 202 may write one or more results (which may be intermediate or final results) to the internal register or internal cache. The processor 202 may then write one or more of those results to the memory 204. In particular embodiments, the processor 202 executes only instructions in one or more internal registers or internal caches or in the memory 204 (as opposed to the storage 206 or elsewhere) and operates only on data in one or more internal registers or internal caches or in the memory 204 (as opposed to the storage 206 or elsewhere). One or more memory buses (which may each include an address bus and a data bus) may couple the processor 202 to the memory 204. The bus 212 may include one or more memory buses, as described below. In particular embodiments, one or more memory management units (MMUs) reside between the processor 202 and the memory 204 and facilitate accesses to the memory 204 requested by the processor 202. In particular embodiments, the memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. The memory 204 may include one or more memories 204, where appropriate. Although this disclosure describes and illustrates particular memory, this disclosure contemplates any suitable memory.

In particular embodiments, the storage 206 includes mass storage for data or instructions. As an example and not by way of limitation, the storage 206 may include a hard disk drive (HDD), a floppy disk drive, flash memory, an optical disc, a magneto-optical disc, magnetic tape, or a Universal Serial Bus (USB) drive or a combination of two or more of these. The storage 206 may include removable or non-removable (or fixed) media, where appropriate. The storage 206 may be internal or external to the computer system 200, where appropriate. In particular embodiments, the storage 206 is non-volatile, solid-state memory. In particular embodiments, the storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the storage 206 taking any suitable physical form. The storage 206 may include one or more storage control units facilitating communication between the processor 202 and the storage 206, where appropriate. Where appropriate, the storage 206 may include one or more storages 206. Although this disclosure describes and illustrates particular storage, this disclosure contemplates any suitable storage.

In particular embodiments, the I/O interface 208 includes hardware, software, or both, providing one or more interfaces for communication between the computer system 200 and one or more I/O devices. The computer system 200 may include one or more of these I/O devices, where appropriate. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, the I/O interface 208 may include one or more device or software drivers enabling the processor 202 to drive one or more of these I/O devices. The I/O interface 208 may include one or more I/O interfaces 208, where appropriate. Although this disclosure describes and illustrates a particular I/O interface, this disclosure contemplates any suitable I/O interface.

In particular embodiments, the communication interface 210 includes hardware, software, or both providing one or more interfaces for communication (such as, for example, packet-based communication) between the computer system 200 and one or more other computer systems 200 or one or more networks. As an example and not by way of limitation, the communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, the computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. The computer system 200 may include any suitable communication interface 210 for any of these networks, where appropriate. The communication interface 210 may include one or more communication interfaces 210, where appropriate. Although this disclosure describes and illustrates a particular communication interface, this disclosure contemplates any suitable communication interface.

In particular embodiments, the bus 212 includes hardware, software, or both coupling components of the computer system 200 to each other. As an example and not by way of limitation, the bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus 212 may include one or more buses 212, where appropriate. Although this disclosure describes and illustrates a particular bus, this disclosure contemplates any suitable bus or interconnect.

In this document, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of the processor 202 (such as, for example, one or more internal registers or caches), one or more portions of the memory 204, one or more portions of the storage 206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. In this document, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), JavaScript Object Notation (JSON) or other suitable markup language.

As mentioned above, the fiber center 70 can incorporate artificial intelligence, or "AI," and the computer system 200 may be one component of that AI. Ubiquitous availability and increasing computing capacity have made it possible for intelligent machines to be used in our daily lives. Consequently, AI is becoming more and more common. AI is defined as the theory and development of computer systems able to perform tasks that normally require human intelligence, such as visual perception, speech recognition, decision-making, and translation between languages. Computer scientists sometimes call AI "machine intelligence" to distinguish intelligence demonstrated by machines from the natural intelligence displayed by human beings. Leading AI textbooks define the field as the study of intelligent agents: any device that perceives its environment and takes actions that maximize its chance of successfully achieving its goals. Colloquially, the term AI is often used to describe machines (or computers) able to mimic cognitive functions that human beings associate with the human mind, such as learning and problem solving. Although lacking a uniformly accepted and clear definition, AI generally involves four steps: collect data, run the data through an analytical model to predict, optimize the model and make decisions, then have the system adapt or learn.

In the past decade, as a result of expanding data availability, improvements in hardware, and novel machine learning (ML) algorithms, AI has shown great promise across a wide array of applications, ranging from digital advertising to self-driving cars to electronic trading platforms. Systems that imitate human intelligence are also integral to recycling. Fundamental to the incorporation of AI in recycling is ML, which uses algorithms to find patterns in massive amounts of data that could include numbers, words, sounds, and images. In recent years, there has been an increased use of AI/ML in the recycling field, especially for tasks that require the analysis of large volumes of data or the interpretation of complex information. Sorting systems will become increasingly economic, for example, as AI is further developed. Intelligent and dexterous robots, which can cheaply pry an object apart and separate out key components and materials, will make a difference. See an article published by PICVISA Machine Vision Systems, S.L. of the United Kingdom titled "Artificial Intelligence: The Recycling Revolution" (Feb. 14, 2020), available at https://recyclinginside.com/artificial-intelligence-the-recycling-revolution/.

Whether implemented using the computer system 200 or not, the automated process 100 offers a number of advantages. Among those advantages is that the process 100 enables involuntary generators to recycle flexible plastics along with used paper in a common container. The process 100 shreds a mix of recyclable waste materials including, but not limited to, a wide variety of paper and flexible plastics (LLDPE, LDPE, HDPE, PP, PS). The process 100 provides an automated separation of a mix of recyclable commodities, including but not limited to paper, OCC, film, flexible plastics, plastic pallets, packaging crates, buckets, drums, and more. The process 100 provides feedstock and acts as a source for a variety of downstream recycling methods including but not limited to mechanical, chemical (pyrolysis, gasification), solvent, and biological treatment. Without the process 100, these downstream recycling methods will not get a recyclable feedstock from mixed commercial and industrial waste streams.

The process 100 disclosed in this document offers one of the needed advances in technologies and systems. For example, recyclers rarely, if ever, handle flexible plastics; instead, flexible plastics are typically discarded. The process 100 enables recyclers to handle flexible plastics. In addition, the purity of recycled paper produced by recyclers has been adversely affected by the inclusion of flexible plastics as a contaminant. The process 100 enables recyclers to provide recycled paper having improved purity.

The fiber center 70 and the process 100 free the MRFs 50 to focus on their core competencies: collecting and separating waste materials. In the process 100, the MRFs 50 make no attempt, and devote no resources, to produce recycled paper and flexible plastics commodities of sufficient purity to be commercially valuable. Rather, the MRFs 50 simply transport their collected and separated output to the fiber center 70.

The fiber center 70 and the process 100 also provide leverage and scale for capturing upside value for recycled flexible plastics. The process 100 enables a huge opportunity to convert previously unrecyclable flexible plastics to commercial, industrial-grade products including but not limited to food, medical, and chemical applications. The operators of the process 100 will be able to drive plastics circularity by manufacturing recycled products. The applications include but are not limited to consumer packaging, bubble wrap, stretch wrap, grocery bags, resealable pouches, films, and the like.

The process 100 enables plastic credits between the manufacturers, consumers, users, and recyclers of plastics. Recovering LDPE film that would otherwise be landfilled creates plastic waste recycling credits under a certified standard including but not limited to the Verra Plastic Waste Reduction Standard which sets a standard to establish criteria to create plastic credit. See https://verra.org. Verra develops and manages standards that are globally applicable and advance action across a wide range of sectors and activities. The Verra standards and programs are trusted by a broad range of stakeholders, provide innovative solutions to environmental and social problems, and work for people and the planet by supporting projects and activities that deliver a range of benefits to communities and their surrounding environments.

Figure 9:
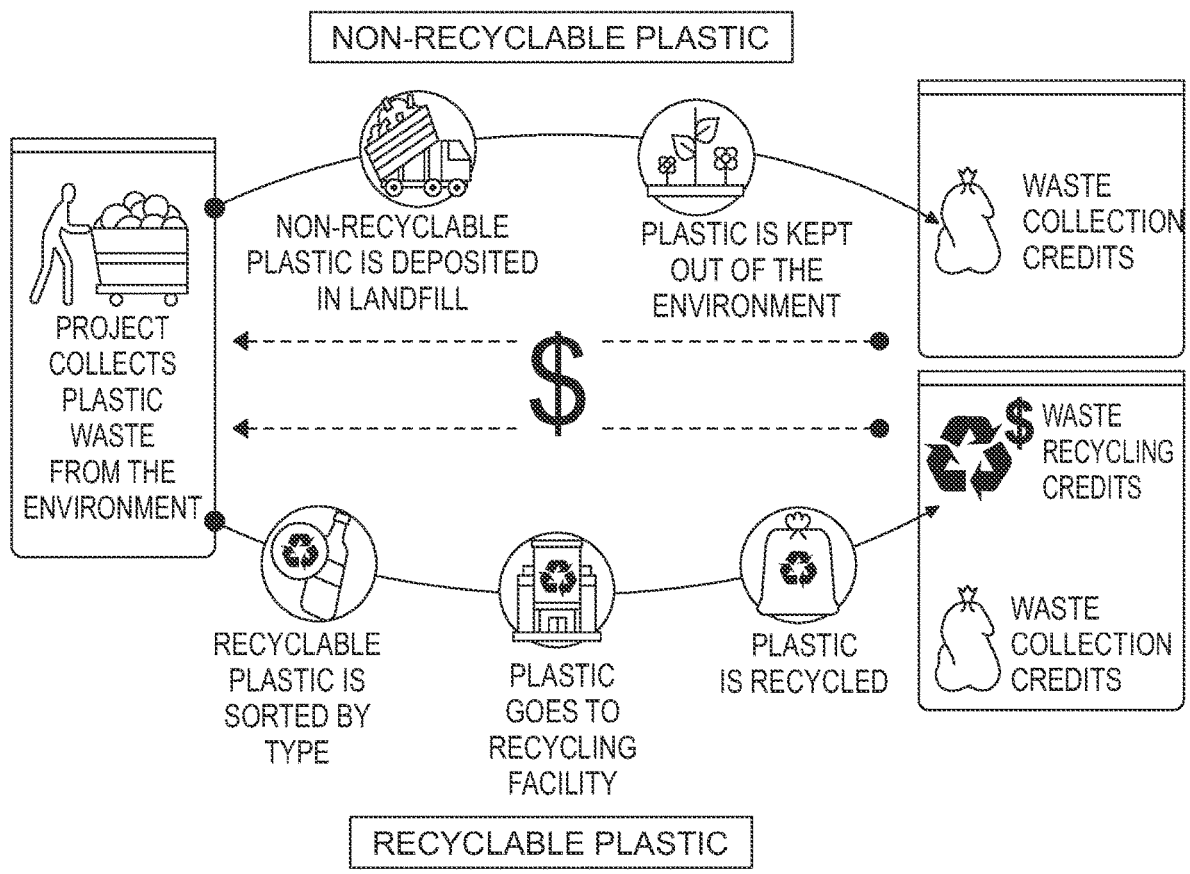
FIG. 9 illustrates the flow of material and credits in a Verra Plastic Standard project example in which flexible plastic waste is collected from the environment.

The Verra Plastic Program projects include a range of plastic waste collection and recycling activities that reduce the amount of plastic waste in the environment and the use of virgin plastic. FIG. 9 illustrates the flow of material and credits in a Plastic Standard project example in which plastic waste is collected from the environment. In this example, the non-recyclable plastic waste is sent to a landfill resulting in Waste Collection Credits and the recyclable plastic waste is sent to a recycler resulting in both Waste Collection Credits and Waste Recycling Credits.

In conclusion, the process 100 disclosed in this document provides several significant advantages over prior art. Among the advantages are labor savings, capital efficiency, improved uptime, higher recovery rate, increased production efficiency, lower footprint (capital costs), and minimized risks upon material sale. These advantages, and others, are achieved by the unique features of the process 100 and the related infrastructure 600. Among these features are the method of material processing, recovery, separation of a mixed material stream, automated aggregation across a hub and spoke model, integrated secondary processing (i.e., the fiber center 70), and higher purity material. High-purity paper can be used readily for recycled packaging by paper mills. Recycled flexible plastics can be generated from a contaminant stream that was otherwise not possible. The process 100 will give recyclers (chemical and mechanical processors) access to high-quality feedstock, enable paper mills to access high-purity feedstock, and allow companies that manufacture consumer packaging to meet their recycling and circularity targets. The process 100 will also help drive footprint reduction for future recycling centers and drive plastics circularity by effective aggregation of flexible plastics from waste streams.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

What is claimed:

1. An automated process for separating and recycling a broad mix of waste material including, paper and flexible plastics, the process comprising:
   collecting the broad mix of waste material at a materials recovery facility;
   presorting the broad mix of waste material and separating at the materials recovery facility the broad mix of waste material into individual commodities comprising partially processed 2D blends and 3D containers;
   separating at the materials recovery facility the partially processed 2D blends from the 3D containers without conducting any quality control of the partially processed 2D blends;
   baling at the materials recovery facility the partially processed 2D blends to form bales of the partially processed 2D blends;
   receiving the bales from the materials recovery facility and aggregating at a fiber center the partially processed 2D blends;
   removing recyclable commodities, including flexible plastics, from the 2D blends at the fiber center; and
   aggregating each recyclable commodity that is removed from the 2D blends and forming separate commodity streams of clean paper and clean flexible plastics for sale by the fiber center,
   wherein separate streams of clean recycled paper having a purity of at least about 98% and clean recycled flexible plastics are created.

2. The automated process according to claim 1 wherein the broad mix of waste material that is collected includes one or more of a residential single stream, industrial waste, and commercial waste.

3. The automated process according to claim 1 wherein the individual commodities include one or more of paper, plastic, metal, cardboard, and glass.

4. The automated process according to claim 1 wherein the step of separating uses one or a combination of magnets, eddy current separators, optical sorters, and air separation devices.

5. The automated process according to claim 1 wherein the step of separating results in (a) a stream of partially processed 2D blends that includes a majority of 2D recyclables and a minority of 3D containers, and (b) a stream of 3D containers that includes a majority of 3D containers and a minority of 2D recyclables.

6. The automated process according to claim 1 wherein the step of baling includes creating bales of finished recyclables.

7. The automated process according to claim 6 further comprising the step of dressing the bales of finished recyclables based on feedback received from a customer to improve their cosmetic appearance before shipment of the bales to the customer.

8. The automated process according to claim 1 wherein the fiber center uses one or more of optical sorters, robotics, artificial intelligence/machine learning, ballistic separators, air knives, and disc screens.

9. The automated process according to claim 1 wherein the recyclable commodities removed from the 2D blends at the fiber center further include PET containers, aluminum, carboard, tin, steel, LDPE film, HDPE film, HDPE containers, PP film, PP containers, SRPN, and mixed paper.

10. The automated process according to claim 1 further comprising the step of selling the separate streams of clean recycled paper and clean recycled flexible plastics.

11. The automated process according to claim 1 further comprising the step of sending the separate streams of clean recycled paper and clean recycled flexible plastics to one or more recyclers resulting in both waste collection credits and waste recycling credits under a certified standard.

12. A hub and spoke infrastructure for separating and recycling a broad mix of waste material including paper and flexible plastics, the infrastructure comprising:
   a plurality of materials recovery facilities collecting a first portion of the broad mix of waste material and creating a first partially processed 2D blends without conducting any quality control of the first partially processed 2D blends;
   a number of recycling facility/transfer stations collecting a second portion of the broad mix of waste material and creating a second partially processed 2D blends without conducting any quality control of the second partially processed 2D blends, and receiving from at least one materials recovery facility the first partially processed 2D blends created by the at least one materials recovery facility; and
   multiple fiber centers, each fiber center collecting the first partially processed 2D blends from one or more of the plurality of materials recovery facilities, the second partially processed 2D blends from one or more of the recycling facility/transfer stations, or both the first partially processed 2D blends and the second partially processed 2D blends from both one or more of the plurality of materials recovery facilities and one or more of the recycling facility/transfer stations and each fiber center being configured to aggregate the first and second partially processed 2D blends, remove recyclable commodities including flexible plastics from the partially processed 2D blends, and aggregate each recyclable commodity that is removed from the first and second partially processed 2D blends and form separate commodity streams of clean paper and clean flexible plastics for sale by the fiber center,
   wherein each of the multiple fiber centers is located geographically in relative proximity to the one or more materials recovery facilities, to the one or more recycling facility/transfer stations, or to both the one or more materials recovery facilities and the one or more recycling facility/transfer stations from which the fiber center collects the partially processed 2D blends.

13. The hub and spoke infrastructure according to claim 12 wherein the plurality of materials recovery facilities and the number of recycling facility/transfer stations constitute spokes and the multiple fiber centers constitute hubs.

14. The hub and spoke infrastructure according to claim 12 wherein one or both of the plurality of materials recovery facilities and the number of recycling facility/transfer stations include one or a combination of magnets, eddy current separators, optical sorters, and air separation devices which are used to create the partially processed 2D blends.

15. The hub and spoke infrastructure according to claim 12 wherein the partially processed 2D blends include a majority of 2D recyclables and a minority of 3D containers.

16. The hub and spoke infrastructure according to claim 12 wherein the multiple fiber centers use one or more of optical sorters, robotics, artificial intelligence/machine learning, ballistic separators, air knives, and disc screens.

17. The hub and spoke infrastructure according to claim 12 wherein the recyclable commodities removed from the partially processed 2D blends at the fiber centers further include PET containers, aluminum, carboard, tin, steel, LDPE film, HDPE film, HDPE containers, PP film, PP containers, SRPN, and mixed paper.

18. The hub and spoke infrastructure according to claim 12 wherein the separate commodity stream of clean paper has a purity of at least about 98%.

19. The hub and spoke infrastructure according to claim 12 wherein the separate commodity streams of clean paper and clean flexible plastics can be sent to one or more recyclers resulting in both waste collection credits and waste recycling credits under a certified standard.

20. One or more computer-readable non-transitory storage media embodying software that is operable when executed to:
   collect a broad mix of waste material including paper and flexible plastics at a materials recovery facility;
   presort the broad mix of waste material and separate at the materials recovery facility the broad mix of waste material into individual commodities;
   separate at the materials recovery facility the partially processed 2D blends from the 3D containers without conducting any quality control of the 2D blends;
   bale at the materials recovery facility the partially processed 2D blends to form bales of the partially processed 2D blends;
   receive the bales from the materials recovery facility and aggregate at a fiber center the partially processed 2D blends;
   remove recyclable commodities, including flexible plastics, from the partially processed 2D blends at the fiber center; and
   aggregate each recyclable commodity that is removed from the partially processed 2D blends and form separate commodity streams of clean paper and clean flexible plastics for sale by the fiber center,
   wherein separate streams of clean recycled paper having a purity of at least about 98% and clean recycled flexible plastics are created.

\* \* \* \* \*